United States Patent [19]
Aström

[11] 3,735,824
[45] May 29, 1973

[54] ARRANGEMENTS IN AND RELATING TO A CHISELLING HAMMER OR SIMILAR PERCUSSION MACHINE

[75] Inventor: Nils Östen Åström, Bromma, Sweden

[73] Assignee: Devac AB, Vallingby, Sweden

[22] Filed: Mar. 3, 1971

[21] Appl. No.: 120,624

[52] U.S. Cl...............................175/213, 173/139
[51] Int. Cl.............................E21b 21/00, E21c 7/00
[58] Field of Search......................175/213, 209, 210, 175/211, 215; 173/139

[56] References Cited

UNITED STATES PATENTS

| | | | |
|---|---|---|---|
| 2,019,332 | 10/1935 | Atkins | 175/213 X |
| 2,339,324 | 1/1944 | Fischer | 175/213 X |
| 2,919,901 | 1/1960 | Sandvig | 175/213 X |
| 3,057,417 | 10/1962 | Sandvig | 175/213 X |
| 3,469,504 | 9/1969 | Neighorn | 173/139 X |
| 3,559,753 | 2/1971 | Meri et al. | 173/139 X |

Primary Examiner—David H. Brown
Attorney—Waters, Roditi, Schwartz & Nissen

[57] ABSTRACT

A chiselling hammer or similar percussion machine, having a pneumatic impact creating and/or vibration generating motor, a motor housing made of a vibration damping material, and a cutting tool provided with a casing structure also made of a vibration damping material and adapted for accommodation in a tool insert opening arranged in connection with the motor housing. Extending from one end of the casing structure to the other is at least one channel which forms a communicating passage between the working zone of the tool and an open through-flow passage within the machine housing proper.

11 Claims, 9 Drawing Figures

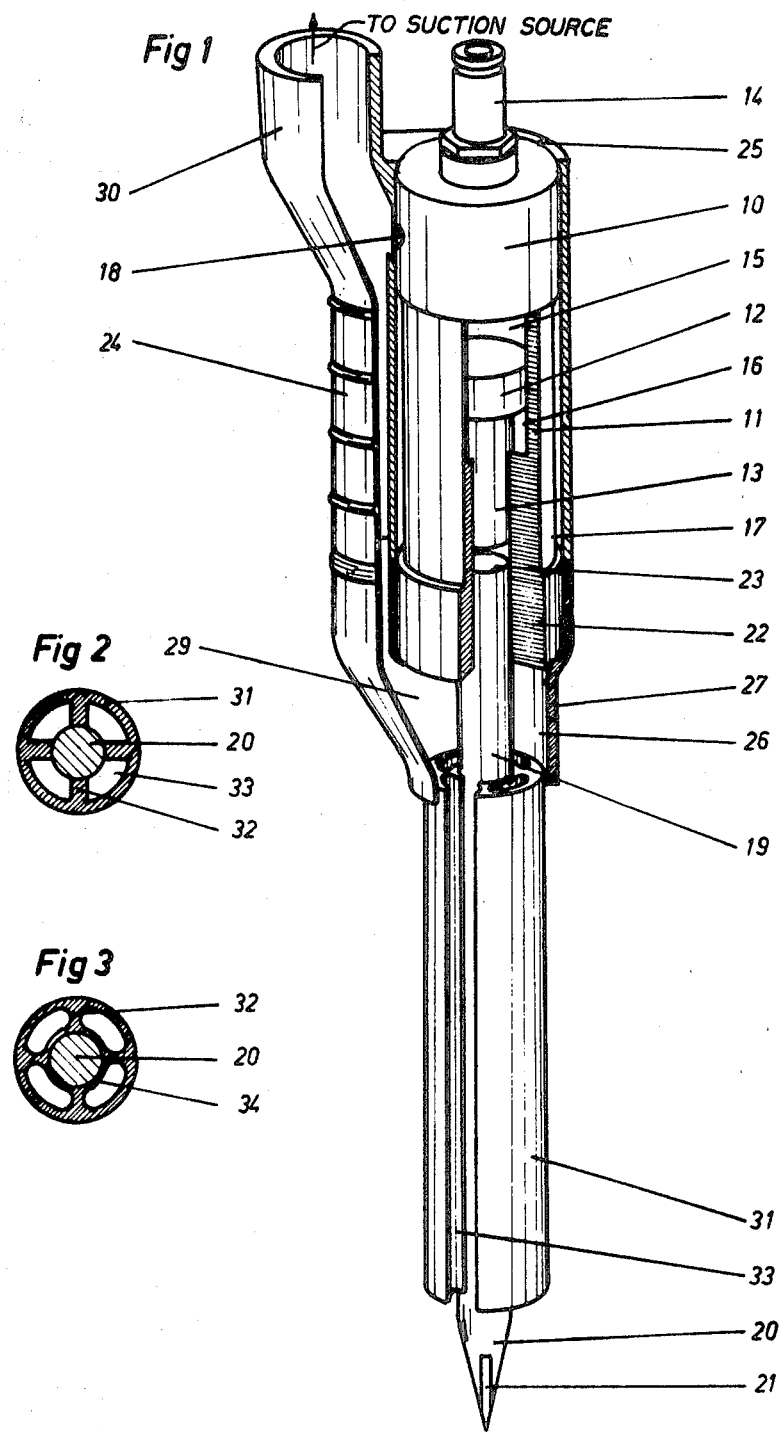

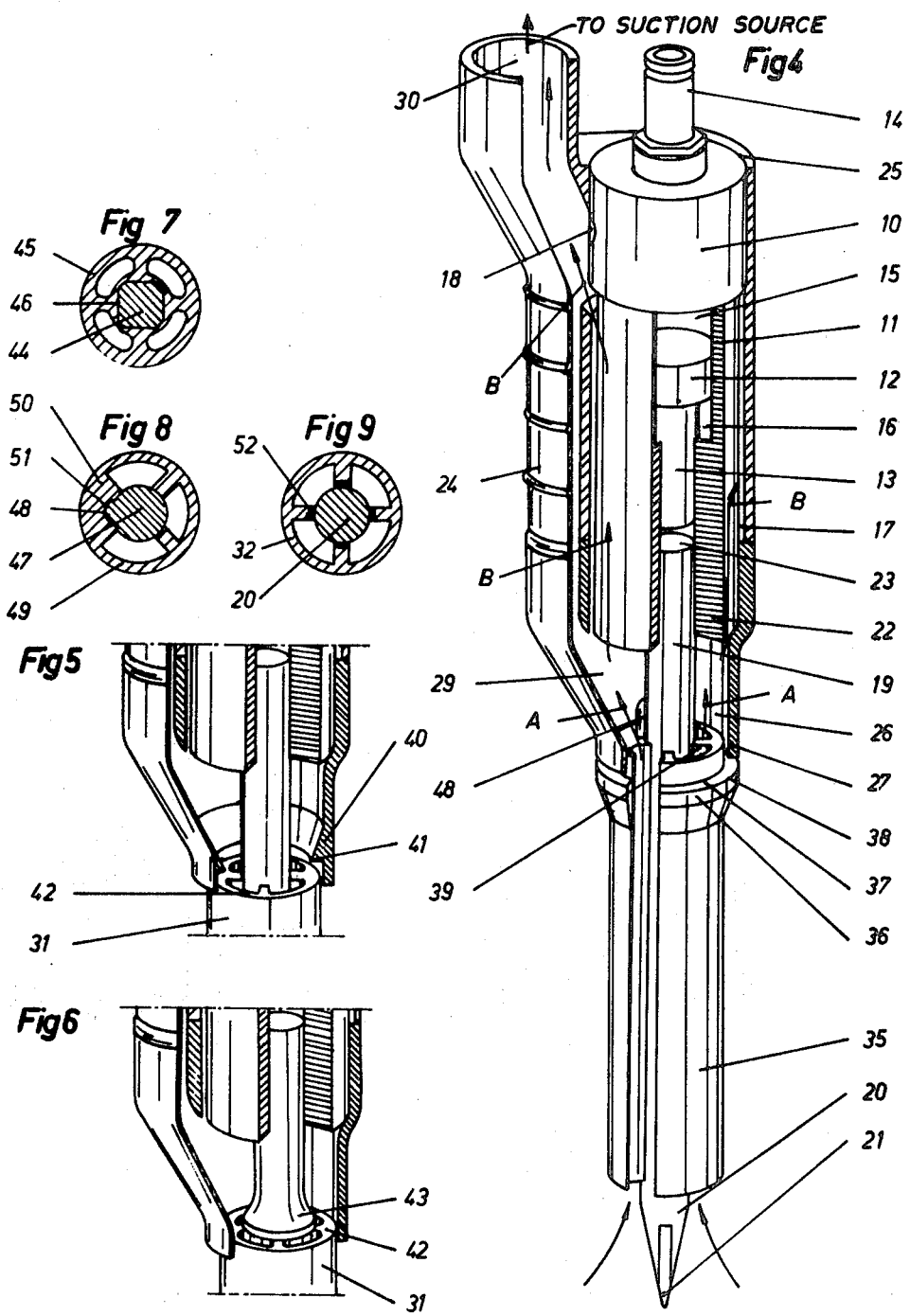

ARRANGEMENTS IN AND RELATING TO A CHISELLING HAMMER OR SIMILAR PERCUSSION MACHINE

The present invention relates to chiselling hammers or similar percussion machines of the type which include a pneumatic impact creating or vibration generating motor which powers an eroding tool such as a chisel or the like.

The very fine dust produced when working with machines of the aforementioned type creates a difficulty resolved problem, since the dust becomes dispersed in the air and when inhaled can give rise to serious illnesses such as silicosis for example.

Many alternative solutions to this special problem have been proposed over recent years. Of these proposals, one particular method and one particular apparatus for removing the dust from the working zone by suction with the assistance of the return air from a compressed air motor driving the tool having gained constantly increasing popularity, owing to their considerable efficiency. With the known apparatus, the dust is removed from the working zone by suction, using a suction line which is separate from the machine and which extends externally of and generally along the cutting tool of the machine and which has its discharge mouth located substantially in the zone of the tip of the cutting tool.

Although this apparatus solves the problem of removing fine dust particles by suction in a particularly satisfactory manner, the separate suction line, owing to its position relative to the machine and the cutting tool in general, is troublesome and more over obscures the working zone. Moreover, it is usual practice to hold the cutting tool itself, either with the fingers or the hand, in order to guide the tool during the working operation. Consequently, there are transmitted to the fingers, arms etc. of the worker, shocks and vibrations which, after only a short period of time, are liable to cause injuries which in serious cases may lead to disablement. Personal injuries sustained when constantly working with rigorously vibrating tools and machines of the aforementioned type are extremely serious and constitute a serious problem from the aspect of industrial safety.

A large number of proposals have also been made with the purpose of solving the problem of reducing the seriousness of injuries caused by shocks and vibrations occuring in the metallic machine housing. One such proposal employs the expedient of lining the machine housing with a shell of vibration damping material. This solution, however, has not shown satisfactory results in practice and, moreover, the task of lining the housing involves a difficult working process.

As previously indicate, the outer shell of the machine housing is normally made of metal and is easily damaged by the rough handling to which machine tools of the type in question are normally subjected.

These and other disadvantages are avoided in the machine of the present invention, which is mainly characterized in that the chiselling hammer consists of a relatively rigid machine housing, moulded or shaped from an elastic or resilient material, such s rubber, plastic or mixtures thereof and in which the percussion or vibration generating motor is detachably enclosed and retained, the machine housing also being provided with free through-flow passages extending in the longitudinal direction of said housing and communicating at one end thereof with a source of low pressure and at the other end thereof opening out into a cutting tool insertion opening, the cutting tool having an enveloping casing of vibration damping material such as rubber, plastic, or the like which is traversed from end to end along the cutting tool by at least one through-flow passage which forms, in the position of use of the tool, a communicating passage between the working zone and the free through-flow passage of the machine housing, the dimensions of the tool insertion opening being adjusted to provide a clearance around the cutting tool when the tool is inserted in the machine housing.

The invention will now be described with reference to an embodiment thereof illustrated diagrammatically in the accompanying drawing, further features of the invention being disclosed in conjunction therewith.

In the drawing, FIG. 1 is a perspective, partly broken away view of a chiselling hammer constructed in accordance with one aspect of the invention and a cutting tool such as chisel connected to the hammer and insulated along its length to prevent propagation of vibrations to the surroundings. FIG. 2 is a cross sectional view of the cutting tool, showing the insulating structure arranged around the cutting tool shown in FIG. 1. FIG. 3 is a modification of the arrangement illustrated in FIGS. 1 and 2, with respect to the insulation of the cutting tool for preventing transmission of vibrations to the surroundings. FIG. 4 is a modification of the embodiment illustrated in FIG. 1 with respect to the actual machine housing and the cutting tool casing. FIG. 5 is a modification of the cutting tool insertion end of the machine housing of the hammer. FIG. 6 is a modified embodiment of the shank portion of the cutting tool. FIGS. 7 and 8 are cross sectional views of two alternative cross sectional configurations of the cutting tool and associated cutting tool casing, and FIG. 9 illustrates a modification of the embodiment of FIG. 2 provided with friction reducing surfaces or wear surfaces arranged on the flanges of the casing abutting the cutting tool.

Illustrated in the drawing by way of example only is a pneumatic percussion hammer of known type, which mainly comprises a piston cylinder 11 in which an impact piston 12 works in a known manner, the piston having a downwardly extending piston stem 13 which forms the actual hammering member of the machine.

The reference numeral 14 indicates a connection for a compressed air hose extending from an external compressed-air source (not shown). Air under pressure is passed through the connection 14 to a compressed air chamber 15 located above the piston 12 in the cylinder 11 and the piston is given a reciprocating movement in the cylinder 11 in a conventional manner by means of the compressed air. Although not shown in the drawing, it is assumed that outlet passages are arranged in a conventional manner to extend from the piston chamber 15 and from the piston chamber 16 located beneath the piston 12. The air consumed and discharged during the working operation flows out through an outlet 18 located at the upper portion of the hammer. Optionally, an annular gap 17 with a cushion of air enclosed therein can be arranged between the actual motor and the encapsulating wall of the machine housing, the cushion of air being operative to equalize temperature and to dampen motor noise and counteract the transmission of vibrations to the external portions of the machine housing.

The reference numeral 19 indicates the shank portion of a detachable cutting tool 20 which, in the embodiment of FIG. 1, is provided with a pointed insert bit 21. The shank 19 is guided in the lower portion 22 of the hammer 10 and the upper surface 23 of the shank is subjected to repeated impacts from the piston stem 13.

The hammer 10, which is constructed of metallic components, is, in accordance with the invention detachably engaged (as for example by screws or the like) in the machine housing 24 made of a vibration damping material such as rubber, or plastic. In accordance with the invention, the wall thickness of the machine housing 24 is of such magnitude that the machine housing is in itself sufficiently rigid to be self supporting, despite the relatively soft material from which it is made. According to the iNvention, the machine housing 24 may comprise two moulded or shaped halves joined together, or, in accordance with the illustrated embodiment, may take the form of an integral unit in which, as indicated at 25, there is provided an opening through which the hammer parts can be inserted and removed for repair, exchange or the like.

The machine housing 24 has at its lower portion, as viewed in the drawing, an opening 26 which, in the illustrated embodiment, is defined by a connecting piece or the like 27 extending there around. Extending longitudinally of the machine housing 24 and passing therethrough is at least one through-flow passage 29, which opens out at the top of the Figure into an outlet 30. It also lies within the purview of the invention to arrange separate through-flow passages, gaps or the like around the hammer 10. The gap 17 referred to above can be used alternatively for this purpose, although in this instance the gap should communicate with inlets and outlets for the air flowing through the machine housing. This is illustrated in more detail in FIG. 4 by the arrows B, which indicate the passage of the air through gaps located between the motor and the wall of the machine housing.

As will be seen from the lower portion of FIG. 1, the shank 19 of the cutting tool 20 is sheathed in a casing or housing 31, which is made of a vibration damping material such as rubber, or plastic having a degree of hardness which varies from case to case. As shown in FIG. 1, one end of the casing 31 projects into the opening 26 in the machine housing, there being located between the wall of the opening and the casing a certain clearance in the form of a gap or the like, which permits the casing 31 and/or the shank 19 to move freely through the opening. The cross sectional configuration of the cutting tool 20 and the casing 31 are shown in more detail in FIG. 2, from with it can be seen that the casing 31 presents internally longitudinally and radially extending integrally formed flanges 32. The flanges 32 are held in engagement with the cutting tool 20 either solely by means of frictional forces, which may vary to a desired degree, or by being bonded thereto, e.g. by means of an adhesive or a mechanical bond. Formed between the flanges 32 are fully-open through-flow passages 33, which extend from the tip 21 of the cutting tool, i.e. from the working zone of the tool, into the passage 29 in the machine housing 24, and communicate via the passage 29 with the outlet 30, a source of low pressure (not shown) and a dust collector (not shown).

The return air flowing into the outlet 30 from the opening 18 towards the source of low pressure provides for an ejector effect which amplifies the suction ability of the low pressure source, resulting in the instantaneous collection and transportation of the dust created by the cutting tool, at the working zone, without The dust being dispersed to the surroundings. Contributing to the efficiency of the arrangement is the fact that the passages 33 in the casing 31 around the body of the cutting tool open out around the tip of the tool at a small distance from the working zone.

In FIG. 3, which illustrates in section a modification of the casing illustrated in FIGS. 1 and 2, the cutting tool is surrounded by a casing 34 of vibration damping material, which is either threaded, pushed or forced onto the body of the cutting tool to slideably engage the same, or is arranged to be retained in a fixed position thereon. Abutting the sleeve 34 are the flanges 32 illustrated in FIG. 2, which may either pass directly into he wall of the sleeve 34 or rest there against or be adhered thereto.

The machine illustrated by way of example in FIG. 1 operates substantially in the following manner. When the hammer 10 is in operation, it subjects the tool 20 to powerful percussion forces whereupon the tip 21 of the tool penetrates the working zone. With machines of this type, a large quantity of dust is usually produced at the tip 21 in the working zone. Because of the subpressure created by the aforementioned separate source of low pressure and the ejector effect obtained as the return air flows out through the opening 18, there is maintained a flow of air which passes from the working zone through the passages 33 in the casing 31, the passage 29 in the machine housing, the outlet 30 and conduits (not shown) to the collecting container or collecting station and the low pressure source, the dust being effectively collected and removed without causing injury to personal. Owing to the fact that the walls of the machine housing 24 are relatively thick and that the machine housing is made solely of a resilient material, the mechanical shocks and vibrations occurring in the metallic components thereof are dampened in an advantageous manner.

Thus, with one and the same arrangement, the machine of the present invention solves the problem of removing the dust, decreasing the noise level and reducing the shocks and vibrations transmitted to the workman, in a surprisingly effective manner. Additionally, the machine is robust and can withstand rough treatment.

In the aforegoing description of the embodiment illustrated in FIG. 1, alternative methods of mounting the casing 31 onto the tool 19, 20 were discussed. According to one of these alternatives, the sleeve 31 may be fixed to the tool 19, 20, by adhesion for example. It also lies within the purview of the invention, however, to anchor the casing 31 to the tool mechanically.

It was surprisingly discovered when experimenting with cutting tools of the aforedescribed type encased in a casing of resilient material that in many cases the best method of counteracting the transmission of vibrations from the cutting tool via the casing to the surroundings is to arrange that the casing and the cutting tool are slideable longitudinally in relation to each other. By consequently arranging the casing so that is can slide along the cutting tool with relatively small friction, the vibration waves which propagate radially outwards from the chisel are arrested and chocked in an advantageous manner. In this way the hands and fingers of the worker are protected in much more effective manner than was previously possible.

It has been found, however, that when using slideable casings, e.g. the casing 31 in FIG. 1, which are inserted directly in the opening 26 in the machine housing, the casing 31 attempts to move upwards during the working operation, i.e. in a direction away from the tip 21 of the cutting tool 20 towards and into the machine housing 24. Consequently, it is constantly necessary to remove the cutting tool from the machine and rearrange the casing 31 on the cutting tool 19, 20, approximately in the position shown in FIG. 1.

This task, however, is troublesome and time consuming, making it desirable to counteract the undesirable relative movement of the cutting tool and the casing by simple means.

This problem can be conveniently solved by arranging in the path of movement of the casing stop means which at least prevent the casing from moving too far into the machine housing, thereby ensuring that the mouths of the air passages extending through the sleeve are fully exposed internally of the machine housing.

One example of such a stop means is illustrated n FIG. 4, which is a view of a machine housing essentially similar to the machine housing illustrated in FIG. 1 and in which the same reference numerals are used to indicate the same machine elements.

In the embodiment illustrated in FIG. 4, the cutting tool 19, 20 is enclosed in a modified casing 35 provided at the upper portion thereof with a substantially conical collar 36 having an abutment surface 37, which is illustrated in the Figure in stop position in abutting relationship with the end edge surface 38 of the machine housing wall 27 surrounding the opening 26. As a result of the engagement of surface 37 with the edge surface 27, the casing 35 is prevented from working too far into the through flow passage 29 of the machine housing, whereby the passages 39 extending through the casing 35 open freely into the passage 29 so that air can flow freely into the passage in the direction of arrows A, and optionally also in the directions of arrows B, along the motor 10 encased in the machine housing.

The conical collar 36 may be an integral portion of the actual casing body 35 or alternatively may be made separately and secured to the casing 35 in an appropriate manner, e.g. by vulcanization, gluing, welding etc., depending upon the material from which the sleeve is made. This arrangement, which is particularly effective in practice, has the possible disadvantage that it can be relatively difficult and time consuming to provide the casing with a collar when it is desired to mass produce the casings as cheaply as possible. Other solutions to this problem are conceivable, however. For instance the solution illustrated in FIG. 5, which is a broken away view, illustrating an alternative embodiment of the lower portion of the machine housing 24. In this instance the wall 40 is provided around the tool insertion opening with an annular shoulder 41 against which the end of, for example, a casing 31 of the type illustrated in FIG. 1 engages to prevent excessive penetration of the casing 31 into the machine housing. Another alternative arrangement for preventing excessive penetration of the casing 31 into the machine housing is illustrated in FIG. 6, according to which the shaft of the cutting tool is provided with a collar 43 against which the central portions of the end surface 42 of the casing engage, thereby preventing continued movement of the casing 31 relative to the cutting into the machine housing.

Additional alternative arrangements of an equivalent nature for stopping penetration of the casing into the machine housing also lie within the purview of the invention.

Thus, the motor may itself be provided with outwardly projecting stop means, arranged to stop the casing from continued penetration into the machine housing without blocking the throughflow passages in the casing.

When working with a chiselling hammer with the enveloping casing 31 or 35 movable relative to the tool in the longitudinal direction thereof, it is often desired to be able to guide the rotary movement of the tip of the tool generally around the axes thereof, to enable precision work to be carried out on the working face. A large number of substantially equivalent alternative constructions are available in this respect, of which two are illustrated in FIGS. 7 and 8. Thus, in accordance with the embodiment of FIG. 7 there is used a cutting tool which presents, at least along the shank thereof, a substantially square cross section. The tool is identified generally with the reference numeral 44, and the surrounding casing 45 is provided with a through passing hole 46 of quadratic cross section and of a shape complementary to the cross section of the tool 44.

FIG. 8 is a cross sectional view of an alternative cutting tool 47 having a substantially circular cross section and provided with a longitudinally extending bead or shoulder 48, also shown in FIG. 4. The casing 49 illustrated in FIG. 8 is provided with an inner bead 50 provided with a groove 51 in which the bead 48 is accomodated in a manner whereby the casing and the tool are guided in relation to each other in the longitudinal direction, but prevented from mutual relative movement in the direction of rotation.

In high frequency percussion machines, when longitudinal relative movement takes place between the harder cutting tool and the relatively soft casing of resilient material, the contacting parts are liable to wear rapidly and the casing around the tool become worn and must be changed. This disadvantage is counteracted in accordance with the invention, however, by arranging friction reducing members or wear surfaces inside the casing. One example of this is illustrated in FIG. 9, which corresponds substantially to the embodiment of FIG. 2 but with which the internal flanges 32 are provided at their cutting tool engaging surfaces with friction reducing linings coatings or wear surfaces, indicated generally with the reference numeral 52. These friction reducing expedients may be in the form of separate components secured to the casing.

The invention is not restricted to the illustrated and described embodiments thereof, but can be varied within the scope of the following claims.

I claim:

1. A percussion machine comprising a pneumatic motor means for generating impact or vibration, a tool coupled to said motor means for being axially driven thereby, a relatively rigid machine housing constructed of an elastic or resilient material detachably supporting said motor means, said machine housing being provided with free through-flow passages extending the longitudinal direction of said housing, said housing having an outlet for said passages adapted for connection at one end thereof with a source of low pressure and an opening at the other end thereof in which said tool can be received, said tool including an enveloping casing constructed of vibration damping material with is traversed from end to end along the tool by at least one through-flow passage which forms, in the position of use of the tool, a communicating passage between the working zone of the tool and the free through-flow passage in the machine housing, the dimensions of the opening in the housing for the tool being such as to provide a clearance around the tool when the tool is inserted in the machine housing.

2. A machine according to claim 1 wherein the opening of the machine housing for the cutting tool is surrounded by a collar arranged to receive the tools, said collar being constituted as a connecting piece which is capable of being attached to the machine housing.

3. A machine according to claim 1 wherein the machine housing is made in one piece and provided with at least one open-ing for inserting working parts of the machine into said housing.

4. A machine according to claim 1 wherein said motor means is so mounted in said housing to provide at least one air gap which forms a through passage which communicates with the free through-flow passages of the machine housing.

5. A machine according to claim 4 wherein said motor means has an air outlet opening discharging into the through-flow passages in the machine housing in a direction towards said outlet of the machine housing.

6. A machine according to claim 1 wherein said tool includes a tool member and a casing with integral longitudinally and substantially radially extending flanges which engage the tool member.

7. A machine according to claim 6 comprising a sleeve of vibration damping material located in immediate contact with the tool member and supporting said flanges.

8. A machine according to claim 6 wherein said casing of vibration damping material is fixed to the tool member.

9. A machine according to claim 6 wherein the tool member and casing are provided with longitudinally extending, interengaging guide means which prevent relative rotation of the casing and tool member about the axis of said tool member.

10. A machine according to claim 6 wherein both the casing of vibration damping material surrounding the tool member and the tool member itself are capable of moving in relation to each other and comprising stop means for limiting movement of the casing with respect to the machine housing.

11. A machine according to claim 10 wherein said stop means comprises abutment surfaces.

* * * * *